United States Patent [19]

Inuzuka et al.

[11] Patent Number: 4,726,249
[45] Date of Patent: Feb. 23, 1988

[54] TRANSMISSION SHIFT LEVER ASSEMBLY

[75] Inventors: Yutaka Inuzuka, Nishio; Akiyoshi Hirai, Toyota; Michiyuki Murakami, Toyoake; George Suzuki, Chiryu; Takahiko Watanabe, Kariya; Takeshi Kondo, Nagoya, all of Japan

[73] Assignees: Toyota Jidosha Kabushiki Kaisha, Toyota; Tsuda Industries Co., Ltd., Kariya, both of Japan

[21] Appl. No.: 917,557

[22] Filed: Oct. 10, 1986

[30] Foreign Application Priority Data

| Oct. 19, 1985 | [JP] | Japan | 60-160453[U] |
| Nov. 14, 1985 | [JP] | Japan | 60-175059[U] |
| Nov. 14, 1985 | [JP] | Japan | 60-175060[U] |
| Dec. 19, 1985 | [JP] | Japan | 60-195822[U] |
| Feb. 28, 1986 | [JP] | Japan | 61-29302[U] |

[51] Int. Cl.$^4$ .............................. G05G 9/16
[52] U.S. Cl. .................. 74/473 P; 74/473 R; 248/181; 403/115; 403/143
[58] Field of Search .............. 74/473 R, 473 P; 248/181; 384/208, 209; 403/114, 115, 141, 143

[56] References Cited

U.S. PATENT DOCUMENTS

| 352,025 | 11/1886 | Zanetti | 403/143 X |
| 969,614 | 9/1910 | Florenz | 403/141 X |
| 1,267,079 | 5/1918 | Jensen | 74/473 P |
| 3,355,198 | 11/1967 | Deibel | 403/143 X |
| 3,540,406 | 11/1970 | Dexter | 403/115 X |
| 3,597,025 | 8/1971 | Ringel | 384/208 |
| 4,132,124 | 1/1979 | Iida | 74/473 R |
| 4,143,560 | 3/1979 | Kinkade et al. | 74/473 R |
| 4,287,784 | 9/1981 | Cedendahl | 74/473 R |
| 4,543,842 | 10/1985 | Katayama | 74/473 P |

FOREIGN PATENT DOCUMENTS 59-180922 12/1984 Japan.

Primary Examiner—Allan D. Herrmann
Attorney, Agent, or Firm—Oblon, Fisher, Spivak, McClelland & Maier

[57] ABSTRACT

A shift lever assembly operatively linked with a transmission, for manually operating the transmission, including a shift lever, a support, and a pair of stationary retainer plates. The shift lever has a handle portion at which the shift lever is manipulated, and a spherical coupling portion at which the shift lever is universally supported. The support consists of two halves in the form of a pair of support sheets which have respective adjoining surfaces substantially parallel to a plane in which the shift lever extends. The support sheets cooperate with each other to provide a spherical support portion which engages the spherical coupling portion of the shift lever for universally supporting the shift lever. Each support sheet has an outer surface opposite to the corresponding adjoining surface. The stationary retainer plates are disposed in spaced-part relation with each other on opposite sides of the support, so as to hold the pair of support sheets at their outer surfaces. The assembly may further include a plurality of bolts which penetrate through the thickness of the support sheets and the retainer plates, for fastening the pair of support sheets to each other via the retainer plates.

11 Claims, 14 Drawing Figures

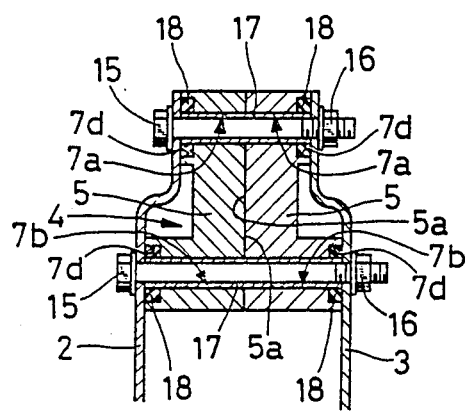
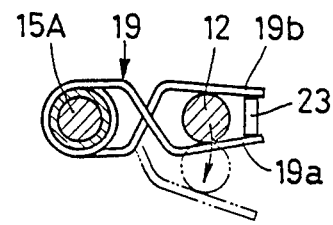
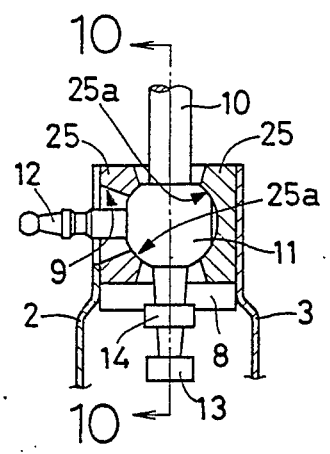
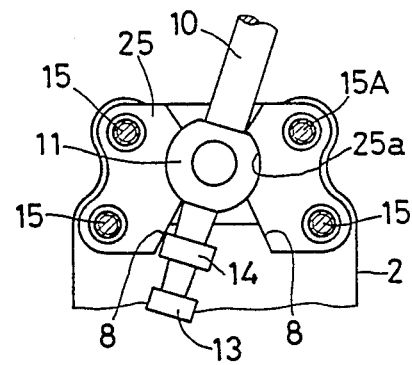

TRANSMISSION SHIFT LEVER ASSEMBLY

BACKGROUND OF THE INVENTION

1. Field of the Invention

The present invention relates to improvements in a shift lever assembly operatively linked with a transmission, in particular for an automotive vehicle, which includes a gear shift lever of a floor shift type manipulated for operating the transmission.

2. Discussion of the Related Art

A typical example of a generally known shift lever assembly of a floor shift type is disclosed in Japanese Utility Model Application published in 1984 as Laid-Open Publication 59-180922, wherein a shift lever is universally supported at its spherical coupling portion by a support structure which consists of two halves in the form of a pair of support sheets whose adjoining surfaces lie in a horizontal plane. The support structure permits the shift lever to be pivoted about the spherical coupling portion in two mutually perpendicular operating planes. Pivotal movements of the shift lever in these two operating planes respectively cause two different gear shifting operations of a transmission with which the shift lever assembly is operatively linked. Another form of a known shift lever assembly is shown in FIG. 13, wherein a shift lever 29 is supported at its spherical coupling portion 30 by a support structure similar to that described above; that is, by a pair of support sheets 32, 33 which are joined together at their horizontal adjoining surfaces. These two support sheets 32, 33 are housed in a retainer cap 31 and are thereby held in position by the retainer cap 31. This retainer cap 31 is fixed to a frame of the shift lever assembly.

However, the shift lever assembly of FIG. 13 tends to have an accumulative dimensional error of the two support sheets 32, 33 and the retainer cap 31, which may result in undesirable displacements of the support sheets relative to each other and to the retainer cap 31 in the vertical direction, upon operation of the shift lever 29. As a result, the point of pivot of the shift lever is fluctuated, and the holding pressure of the support structure acting on the spherical coupling portion of the shift lever is changed, whereby the operating force of the shift lever is accordingly varied. To deal with this problem, the use of an elastic shim 34 as illustrated in FIG. 13 has been proposed to compensate for a possible variation in the relative dimensional error of the components. However, this solution increase the number of the components of the shift lever assembly, and makes it difficult to assemble the shift lever assembly.

Another form of a shift lever assembly of a floor shift type is illustrated in FIG. 14, wherein the support structure for supporting the shift lever 29 at its spherical coupling portion 30 is held in position on a support frame 35 such that the two support sheets are held in position via an elastic shim or cushion within a retainer cap 36 fixed to the frame 35. As previously described the shift lever 29 is supported pivotally in two mutually perpendicular operating planes, so that the shift lever 29 may have a first and a second pivotal movement about its spherical coupling portion in the respective first and second operating planes. The second pivotal movement is imparted to a bellcrank 37 which is pivotally supported by a support shaft 38. This support shaft 38 for the bellcrank 37 is supported by a retainer bracket 39 which is bolted to the upper surface of the support frame 35. The first pivotal movement is limited by stop members 40 which are welded or otherwise fixed to the appropriate portions of the support frame 35.

In the thus constructed shift lever assembly of FIG. 14, the shift lever 29 and the bellcrank 37 are supported by separate members secured to the support frame 35 independently of each other. Namely, the shift lever 29 is universally supported by the retainer cap 36 secured to the frame 35, while the bellcrank 37 is pivotally supported by the support shaft 38 fixed to the retainer bracket 39, and so secured to the frame 35. Therefore, the bellcrank 37 and the shift lever 29 which are linked with each other tend to have a variation in their relative positional relation. Further, a possible error in position of the stop members 40 relative to the support frame 35 causes a positioning error of the shift lever 29 at the opposite ends of its first pivotal movement. In other words, it is necessary to position the retainer bracket 35 (support shaft 38) and the stop members 40 relative to the support frame 35, so as to achieve accurate positioning of the bellcrank relative to the shift lever 29. However, the use of these retainer bracket 35, stop members 40, etc. in addition to the retainer cap 36 increases the number of the components of the shift lever assembly, leading to increased difficulty and cost of manufacture of the shift lever assembly.

SUMMARY OF THE INVENTION

It is accordingly an object of the present invention to provide a shift lever assembly which is relatively simple in construction, and relatively easy to assemble.

Another object of the invention is to provide a shift lever assembly which uses a relatively small number of components, and is excellent in relative positioning accuracy of the components.

A further object of the invention is the provision of a shift lever assembly which is protected against inaccuracies due to thermal expansion of the components.

A still further object of the invention is the provision of a shift lever assembly wherein the shift lever is universally supported with a suitable constant holding pressure, and is protected from rattling movements and wear at its coupling portion.

A yet further object of the invention is to provide a shift lever assembly which has means for absorbing vibrations imparted to the assembly.

According to the present invention, there is provided a shift lever assembly capable of being operatively linked with a transmission for manually operating the transmission, comprising a shift lever, a support, and a pair of stationary retainer plates. The shift lever includes a handle portion by which the shift lever is manipulated, and a spherical coupling portion at which the shift lever is universally supported.

The support consists of two halves in the form of a pair of support sheets which have respective adjoining surfaces substantially parallel to a plane in which the direction of elongation of the shift lever extends, the pair of support sheets cooperating with each other to provide a spherical support portion which engages the spherical coupling portion of the shift lever for universally supporting the shift lever. Each of the pair of support sheets has an outer surface opposite to the corresponding adjoining surface.

The pair of stationary retainer plates are disposed in spaced-apart relation with each other on opposite sides of the support, so as to hold the pair of support sheets at the outer surfaces thereof.

In the shift lever assembly of the present invention constructed as described above, the support for universally supporting the shift lever includes the two support sheets which are retained at their outer surfaces by the corresponding two retainer plates disposed on the opposite sides of the support. Since the retainer plates, which are spaced apart from each other, hold the two support sheets together so as to sandwich the assembly of the support sheets on its opposite sides, the instant shift lever assembly does not require an elastic shim or cushion as needed in the known shift lever assembly which uses a retainer cap for holding two supports sheets whose adjoining surfaces lie in the horizontal plane. The use of the retainer plates in place of a retainer cap eliminates accumulative dimensional errors of the support sheets and the retaining means. Consequently, the coupling point of the spherical support portion formed by the two support sheets relative to the spherical coupling portion of the shift lever is exactly established by merely clamping the two support sheets together at their adjoining surfaces by the two retainer plates, provided that the spherical support portion of the two support sheets is dimensioned as required. Absent the conventionally used retainer cap and elastic cushion, the assembly is easy to assemble with satisfactory positioning accuracy.

Further, the spherical support portion permits the spherical coupling portion of the shift lever to maintain the predetermined pivot point, and the present shift lever assembly is free from an undesirable variation in the frictional holding pressure of the spherical support portion of the support sheets, which acts on the spherical coupling portion of the shift lever. Accordingly, the shift lever may be operated with a substantially constant operating force.

According to one advantageous feature of the invention, the shift lever further includes an abutment portion, and is pivotally supported about the spherical coupling portion in a first operating plane between a first and a second position. The pair of support sheets comprise a pair of stopper portions, and the abutment portion of the shift lever is abutable against the pair of stopper portions when the shift lever is pivoted to the first and second positions, respectively. In this case, the shift lever may be located precisely at the first and second positions, since the ends of the pivotal movement of the shift lever are determined by the stopper portions which are integral with the support, i.e., which are formed with the two support sheets which pivotally support the shift lever. Thus, the positioning accuracy of the shift lever in the present shift lever assembly is improved, as compared with that in the conventional assembly wherein the stoppers are provided as members separate from the support for the shift lever, which stoppers are welded, for instance, to a suitable bracket which must be precisely positioned relative to the support sheets.

According to another advantageous feature of the invention, the shift lever assembly further includes a plurality of bolts which penetrate through thicknesses of the pair of support sheets and the pair of retainer plates, for fastening the pair of sheets to each other via the pair of retainer plates. In this arrangement, the initially established positions of the two support sheets relative to each other are maintained by the bolts which hold the retainer plates at their predetermined holding positions for holding the two support sheets in their intended positions.

In one form of the above feature of the invention, the shift lever assembly further includes a bellcrank having a first arm, and a second arm connected to a cable which is in turn connected to the transmission. The shift lever further includes an selector arm which extends from the spherical coupling portion. The selector arm has a spherical universal coupling end which engages the first arm of the bellcrank. One of the plurality of bolts serves as a support shaft for pivotally supporting the bellcrank, whereby the bellcrank is pivoted about the support shaft when the shift lever is pivoted in a second operating plane in which the selector arm extends. In this instance, the positioning accuracy of the bellcrank relative to the selector arm of the shift lever is improved, since the bellcrank is pivotally supported by one of the bolts which penetrate through the support sheets, that is, both the shift lever and the bellcrank are supported by the same support structure in the form of the two support sheets clamped together as a unit. Therefore, the present arrangement does not require an adjustment of the relative position between the shift lever and the pivot point of the bellcrank, as required in the conventional arrangement using an exclusive support shaft for the bellcrank. Accordingly, the number of components of the shift lever assembly is reduced. For the same reason, one of the pair of retainer plates may advantageously include a pair of integrally formed stopper portions which are abutable on the bellcrank to limit a pivotal movement of the bellcrank about the support shaft.

In another form of the above feature of the invention, the shift lever assembly further includes a plurality of collars made of a material having substantially the same coefficient of thermal expansion as the material of the bolts, and a plurality of elastic members. The pair of support sheets have a plurality of bolt holes in which the plurality of collars are inserted, respectively. The plurality of bolts extend through the plurality of collars, respectively. Each of the collars has opposite end faces which are held in abutting contact with the pair of retainer plates, so as to receive tightening forces produced by the plurality of bolts. Each of the plurality of elastic members in interposed between the corresponding retainer plate and the corresponding support sheet. The two support sheets are clamped together by elastic forces of the plurality of elastic members. Since the bolts and the collars have substantially the same thermal expansion coefficient, the tightening force of the bolts against the collars is kept constant irrespective of thermal expansion of the bolts and collars. Further, the elastic members may absorb possible displacements of the support sheets relative to the collars and bolts due to a difference in thermal expansion coefficient between the collars (bolts) and the support sheets. In other words, the difference in the thermal expansion coefficient between the support sheets and the collars will not result in a significant change in the tightening forces imparted from the retainer plates to the support plates, since a variation in the distance between the retainer plates and the outer surfaces of the support sheets is effectively absorbed by the elastic deformation of the elastic members interposed therebetween. Thus, the support sheets are protected from excessive thermal stresses which may lead to a permanent set of the spherical support portion. Further, the elastic members provide for compensation for possible dimensional errors of the support sheets and collars, and contribute to avoiding rattling movements of the components and consequent noises and wear, and loosening of the bolts.

In a further form of the same feature of the invention, the shift lever assembly further includes a plurality of elastic vibration-insulating members which are disposed between the pair of support sheets, and the pair of retainer plates and the plurality of bolts. The elastic vibration-insulating members are made of a material having a higher degree of elasticity than materials of the support sheets, the retainer plates and the bolts. This arrangement may enjoy the same advantages as indicated just above. In addition, the same arrangement is effective in preventing vibrations or oscillations of the engine or transmission of the vehicle from being transmitted to the shift lever through the assembly. Thus, the elastic vibration insulating members contribute to enhanced feel of the shift lever when gripped by the vehicle operator.

In a still further form of the same feature of the invention wherein the bolts are used to fasten the two support sheets together, the support sheets are made of an elastic material, and the plurality of bolts consist of a first group of bolts and a second group of bolts. The first and second groups of bolts are disposed symmetrically with each other with respect to a plane perpendicular to the adjoining surfaces of the pair of support sheets. In this arangement, each support sheet may have a symmetrical configuration, which is advantageous from the standpoint of reducing an influence of the thermal expansion and contraction of the spherical support portion of the support sheets, on the spherical coupling portion of the shift lever. Thus, the present arrangement is capable of supporting the spherical coupling portion of the shift lever with a predetermined constant holding pressure.

In acordance with a further advantageous feature of the invention, the spherical support portion of the pair of support sheets of the support has a wall thickness small enough to elastically hold the spherical coupling portion of the shift lever. In this arrangement, the thin-walled spherical support portion may elastically yield upon assembling of the shift lever assembly, with dimensional errors of the spherical coupling portion of the shift lever and the two support sheets. Further, the thin-walled spherical support portion may also elastically yield when thermal stresses are applied to the support sheets. Elastic deformation of the thin-walled spherical support portion of the support sheets absorbs dimensional errors relative to the spherical coupling portion of the shift lever, and also absorbs thermal expansion or contraction of the support sheets and the coupling portion. In either case, the elastic deformation of the thin-walled spherical support portion contributes to maintaining a proper holding pressure against the spherical coupling portion of the shift lever. Further, the elasticity of the thin-walled spherical support portion is effective to maintain a holding pressure against the spherical coupling portion even when the relative position of the spherical support portion and the sperical coupling portion is varied due to their wear during the use of the shift lever assembly. Hence, the thin-walled spherical support portion is advantageous for stable and smooth support of the shift lever at its coupling portion.

In one form of the above feature of the invention, the shift lever assembly further includes a plurality of bolts which penetrate through the thickness of the support sheets and the retainer plates, for fastening the support sheets to each other via the retainer plates, and the shift lever further includes an abutment portion, and is pivotally supported about the spherical coupling portion in the first operating plane between a first and a second position. The pair of support sheets include a pair of stopper portions, so that the abutment portion of the shift lever is abutable against the pair of stopper portions when the shift lever is pivoted in the first plane to the first and second positions, respectively. The pair of support sheets further have reinforcement portions through which bolt holes are formed to accommodate the bolts, respectively. The reinforcement portions extend from the pair of stopper portions so as to reinforce the stopper portions. Stated differently, the portions of the support sheets through which the bolts extend for fastening the sheets together function as reinforcement ribs for increasing the rigidity of stregnth of the stopper portions, whereby the support sheets with the thin-walled spherical support portion are made comparatively less massive, yet rigid enough to also serve as the stoppers for the shift lever.

BRIEF DESCRIPTION OF THE DRAWINGS

The above and other objects, features and advantages of the present invention will become more apparent by reading the following description of preferred embodiments of the invention, when considered in connection with the accompanying drawings, in which:

FIG. 5 is a cross sectional view, taken along line 5—5 of FIG. 7 showing a part of the assembly by which the pair of support sheets are fastened to each other via retainer plates;

FIG. 8 is a view of a return spring for the shift lever;

FIG. 9 is a fragmentary elevational view in cross section of another embodiment of the invention;

FIG. 10 is a cross sectional view taken along line 10—10 of FIG. 9;

DESCRIPTION OF PREFERRED EMBODIMENTS

Figure 1:
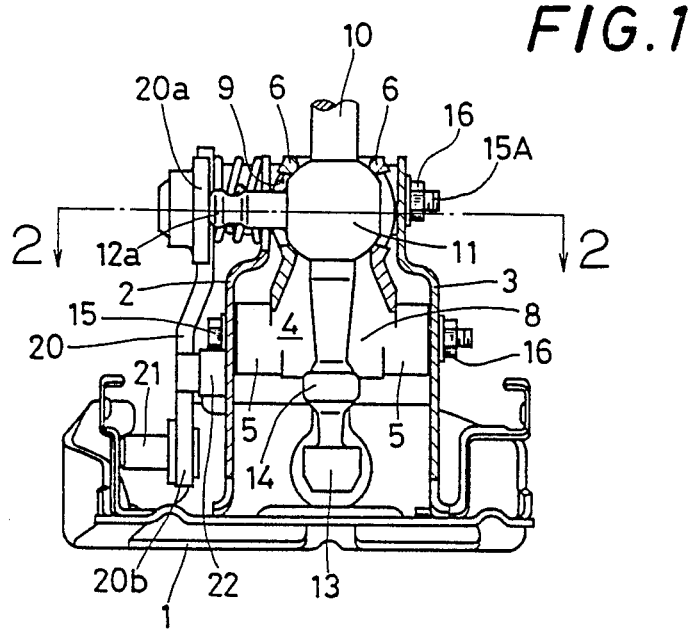
FIG. 1 is an elevational front view in vertical cross section of one embodiment of a shift lever assembly of a floor shift type of the present invention taken along line 1—1 of FIG. 2.
Figure 2:
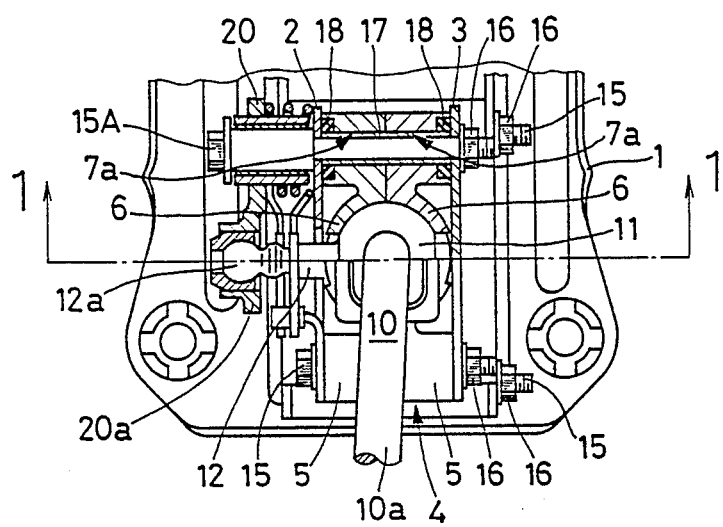
FIG. 2 is a fragmentary plan view, partly in cross section taken along line 2—2 of FIG. 1, of the shift lever assembly of FIG. 1.

To further clarify the principle of the present invention, the preferred embodiments of the present invention will now be described by reference to the accompanying drawings:

Referring first to FIGS. 1–8, there is illustrated the first embodiment of the present invention adapted to manually operate a transmission in an automotive vehicle. In FIGS. 1 and 2, reference numeral 1 designates a base plate to which a pair of stationary retainer plates 2, 3 are integrally welded or otherwise secured, such that the retainer plates 2, 3 are generally perpendicular to the base plate 1. The retainer plates 2, 3 are disposed so as to sandwich a support 4 in the form of a pair of support sheets 5, 5 which are joined together at their adjoining surfaces 5a, 5a. More specifically, the support sheets 5, 5, are held at their outer surfaces by the retainer plates 2, 3 which are spaced apart from each other in a direction parallel to the upper surface of the base plate 1, such that the adjoining surfaces 5a, 5a of the support sheets 5, 5 are perpendicular to the upper surface of the base plate 1. As clearly shown in FIGS. 3 and 4, the support 4 constituted by the support sheets 5, 5 has two upper bolt holes 7a, 7a, and two lower bolt holes 7b, 7b, which holes 7a, 7b are formed through the thickness of the support 4 (support sheets 5, 5).

Four collars 17, 17 are inserted through the bolt holes 7a, 7b, respectively, such that the opposite end faces of each collar 17 are held in abutting contact with the inner surfaces of the retainer plates 2, 3. Further, four bolts 15 are respectively inserted through the collar 17, penetrating the appropriate portions of the retainer plates 2, 3, so that the two support sheets 5, 5 jointed together at their adjoining surfaces 5a, 5a are fastened to each other by the retainer plates 2, 3 which are tightened against the end faces of the collars 17 by the bolts 15 and corresponding nuts 16 on the threaded end of the bolts 15. It is noted that the diameters of the collars 17 and the bolt holes 7a, 7b are determined so that there exists a very small or substantially no clearance between the inner surface of the bolt hole 7a, 7b and the outer surface of the collar 17. Therefore, the two support sheets 5, 5 are accurately positioned relative to each other, by inserting the collars 17 into the bolt holes 7a, 7b. Further, the diameter of the bolts 15 is determined so that there exists a suitable amount of clerance between the outer surface of the both 15 and the inner surface of the collar 17. The clearance prevents the bolts 15 from exerting an undesirable force onto the support sheets 5, 5, via the collars 17. For the reason which will be described, the collars 17 are made of a material having substantially the same coefficient of thermal expansion as a material of the bolts 15. Since the retainer plates 2, 3 are held in abutting contact with the ends of the collars 17, the support sheets 5, 5 are protected against an excessive tightening force produced by the bolts 15 and the corresponding nuts 16. That is, the collars 17 are adapted to receive the tightening forces produced by the bolts 15 and the nuts 16.

As shown in FIG. 5, an elastic member 18 in the form of a ring is accommodated in a counterbore 7d formed at each end of each bolt hole 7a, 7b. Thus, each elastic member 18 received in the counerbore 7d is fitted on the corresponding end of the corresponding collar 17. The depth of the counterbores 7d and the width of the elastic members 18 are determined so that the elastic member 18 is held in pressed contact with the inner surface of the corresponding retainer plate 2, 3 and the walls of the counterbore 7d, when the retainer plates 2, 3 are tightened against the ends of the collars 17 by the bolts 15 and the nuts 16. In this arrangement, therefore, the support sheets 5, 5 are clamped together by elastic forces of the elastic members 18. These elastic members 18 also function to prevent the nuts 16 from being loosened on the bolts 15.

Since the bolts 15 and the collars 17 have substantially the same thermal expansion coefficient, the tightening force of the bolts 15 against the collars 17 is kept constant irrespective of the thermal expansion or contraction of the bolts and collars. Further, the elastic members 18 may absorb not only dimensional errors of the support sheets 5, 5 and the collars 17, but also possible displacements of the support sheets 5, 5 relative to the collars 17 and the bolts 15 due to a difference in thermal expansion coefficient between the collars 17 (bolts 15) and the support sheets 5, 5. In other words, a variation in the distance between the retainer plate 2, 3 and the outer surface of the support sheet 5, 5 is effectively absorbed by elastic deformation of the elastic member 18 interposed therebetween. Thus, the support sheets 5, 5 are protected from excessive thermal stresses which may lead to a permanent set.

Figure 6:
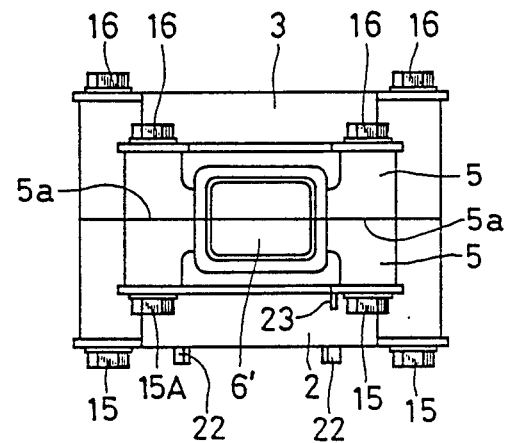
FIG. 6 is a plan view showing an arrangement of fixing bolts for fastening the support sheets together.
Figure 7:
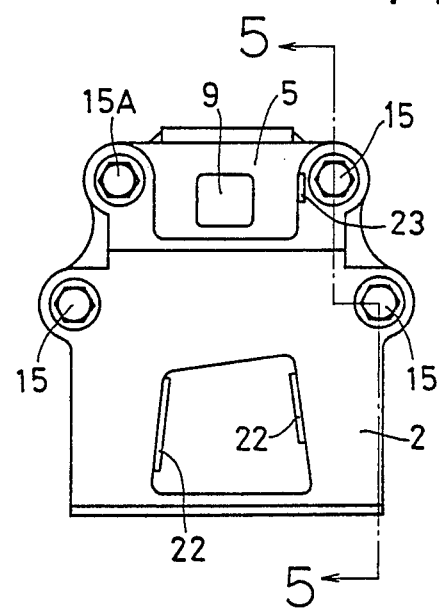
FIG. 7 is an elevational side view showing the arrangement of the fixing bolts.

As indicatated in FIGS. 6 and 7, the four bolt holes 7a, 7b (and bolts 15, 15) consist of a first group of two left-hand side bolt (two left bolts) and a second group of two right-hand side bolt holes (two right bolts). The first and second groups of bolt holes 7a, 7b are disposed symmetrically with each other with respect to a plane which is perpendicular to the adjoining surfaces 5a, 5a of the two support sheets 5, 5 and which includes the pivot point of the spherical coulping portion 11 of the shift lever 10, the shift lever 10 having a handle portion opposite the coupling portion 11. Thus, each support sheet 5 has a symmetrical configuration. This symmetry is desirable for minimizing any influence of the thermal expansion or contraction of the support sheets 5, 5 on a spherical coupling portion 11 of a shift lever 10 which will be described. The shift lever 10 is elongate with a direction of elongation 10a.

Figure 3:
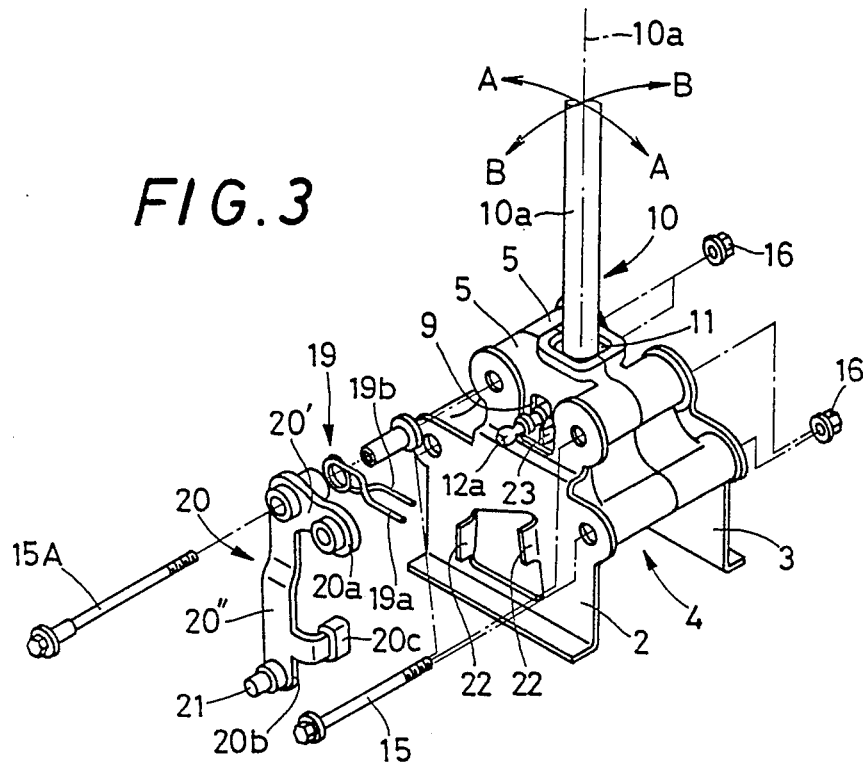
FIG. 3 is an exploded view in perspective of the shift lever of FIG. 1.
Figure 4:
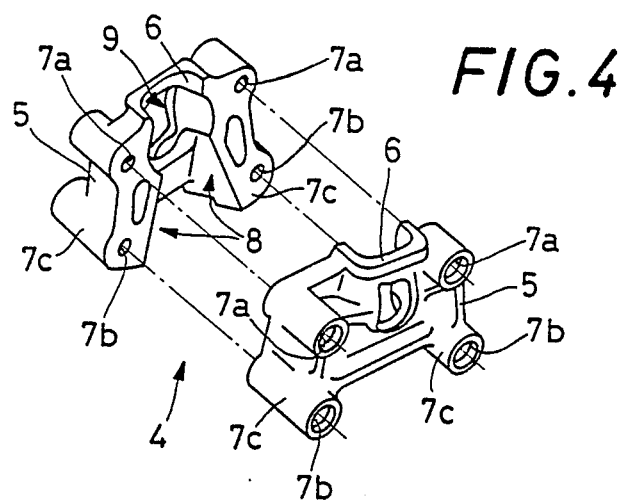
FIG. 4 is an exploded view in perspective of a support of the one embodiment in the form of a pair of support sheets for universally supporting a shift lever of the shift lever assembly.

The support sheets 5, 5 are made of an elastic material such as a synthetic resin or rubber. Each of the elastic support sheet 5 has a relatively thin-walled hemi-sherical portion 6, as indicated in FIGS. 2 and 4, so that the two hemi-spherical portions 6, 6 of the two sheets 5 cooperate to form a spherical support portion 6' in which the spherical coupling portion 11 of the shift lever 10 is accommodated as shown in FIGS. 1–3. Thus, the shift lever 10 is universally pivotally supported at its spherical coupling portion 11 by the thin-walled spherical support portion 6'. More precisely stated, the shift lever 10 is supported pivotally in a first operating plane parallel to the adjoining surface 5a, 5a of the support sheets 5, 5, as indicated by arrows A—A in FIG. 3, and in a second operating plane perpendicular to the adjoining surfaces 5a, 5a, as indicated by arrows B—B in the same figure.

As illustrated in FIG. 1, the shift lever 10 has a connecting lower end 13 at which the shift lever is operatively linked via a first push-pull cable (not shown) with the previously indicated transmission gear device. The shift lever 10 further has a selector arm 12 which extends from the spherical coupling portion 11 and projects out of the support 4 through an aperture 9 formed through the wall of the spherical support portion 6', as most clearly shown in FIG. 3. The selector arm 12 has a spherical universal coupling end 12a which will be described.

The thin-walled spherical support portion 6' has an inside diameter which is slightly smaller than the diameter of the spherical coupling portion 11 of the shift lever 10, so that the spherical coupling portion 11 is elastically held within the thin-walled elastic spherical support portion 6', with a suitable elastic force acting on the coupling portion 11. That is, the spherical support portion 6 has a wall thickness small enough to provide sufficient elasticity to elastically hold the spherical coupling portion 11.

The shift lever 10 further has an abutment portion 14 as seen in FIG. 1. Each sheet 5, 5 of the support 4 is formed with a pair of stopper portions 8, 8 located below the spherical support portion 6' and adjacent to portions 7c, 7c through which the lower bolt holes 7b are formed, as shown in FIG. 4. The abutment portion 14 is abutable against the stopper portions 8, 8 when the shift lever 10 is moved in the first operating plane A—A between at its first and second positions, respectively, which positions define a range of pivotal movement of the lever 10 in the first operating plane indicated at A—A in FIG. 3. Thus, the stopper portions 8, 8 cooperate with the abutment portion 14 to limit the pivotal movement of the shift lever 10 in the first operating plane A—A.

The portions 7c, 7c through which the two lower bolt holes 7b are formed function to reinforce the corresponding stopper portions 8, 8. That is, the portions 7c serve as reinforcement portions for increasing the rigidity of the stopper portions 8, 8.

One of the two upper bolts 15, 15 serves as a support shaft 15A for pivotally supporting a bellcrank 20 which engages the universal coupling end 12a of the aforementioned selector arm 12 of the shift lever 10, as shown in FIG. 2. Described in greater detail referring to FIG. 3 in particular, the bellcrank 20 has a first arm 20' with the free end 20a engaging the coupling end 12a of the selector arm 12, and a second arm 20" which has a pin 21 fixed thereto. The bellcrank 20 pivotally supported on the support shaft 15A is operatively connected at the pin 21 to the transmission gear device, via a second push-pull cable (not shown). Since the support shaft 15A is connected directly to the support sheets 5, 5 which support the shift lever 10 with the selector arm 12 (i.e. extends through the holes 7a thereof), the end 20a of the first arm 20' of the bellcrank 20 is comparatively precisely aligned with the coupling end 12a of the selector arm 12 of the shift lever 10.

As also shown in FIG. 3, the bellcrank 20 is formed with an abutment portion in the form of an extension 20c which extends from a lower portion of the second arm 20". The retainer plate 2 is formed with a pair of spaced-apart opposed stopper portions 22, 22, so that the abutment portion 20c of the bellcrank 20 is abuttable onto the stopper portions 22, 22 when the ballcrank 20 is pivoted about the support shaft 15A during movement of the shift lever 10 in second operating plane B—B between its third and fourth positions. Thus, the ends of the pivotal movement of the bellcrank 20, and so of the shift lever in the second operating plane B—B, are determined by its abutment portion 20c and the stopper portions 22, 22 of the retainer plate 2.

In the shift lever assembly constructed as described above, a pivotal movement of the shift lever 10 about its spherical coupling portion 11 in the first operating plane A—A (FIG. 3) is imparted to the transmission through the lower connecting end 13, and the first push-pull cable. On the other hand, a pivotal movement of the shift lever 10 in the second operating plane B—B (FIG. 3) is first imparted to the bellcrank 20 via the selector arm 12, whereby the bellcrank 20 is pivoted about the support shaft 15A. The resulting movement of the pin 21 at the end of the second arm 20" of the bellcrank 20 is imparted to the transmission through the second push-pull cable connected to the pin 21.

As previously described, the pivotal movement of the shift lever 10 in the first operating plane A—A is limited by the abutting contact of its abutment portion 14 with the stopper portions 8, 8 formed integrally with the support 4 (support sheets 5, 5). On the other hand, the pivotal movement of the shift lever 10 in the second operating plane B—B is limited by the abutting contact of its abutment portions 20c with the stopper portions 22, 22 formed integrally with the retainer plate 2.

As shown in FIGS. 3 and 8, a return torsion spring 19 is disposed on the support shaft 15A such that two arm portions 19a, 19b grip the selector arm 12 of the shift lever 10, and the ends of the two arms 19a, 19b bear on a tab 23 formed on the retainer plate 2, when the shift lever 10 is placed in its neutral position in its second operating plane B—B. When the shift lever 10 is pivoted in one of opposite directions in the second operating plane B—B, one arm portion (the arm 19a in FIG. 8) of the return spring 19 is resiliently displaced while being pushed by the selector arm 12, in a direction away from the tab 23, as indicated in phantom lines in FIG. 8, but the other arm portion (19b in FIG. 8) of the spring 19 is held in pressed contact with the tab 23. Therefore, the return spring 19 can give a resilient force for returning the selector arm 12 to its original position indicated in solid lines in FIG. 8.

Figure 13:
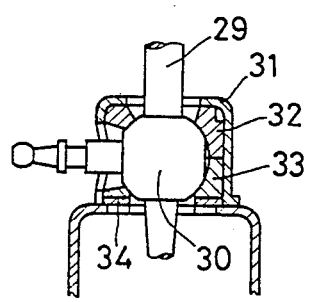
FIG. 13 is a view in cross section illustrating a support structure for a shift lever in a shift lever assembly known in the art.
Figure 14:
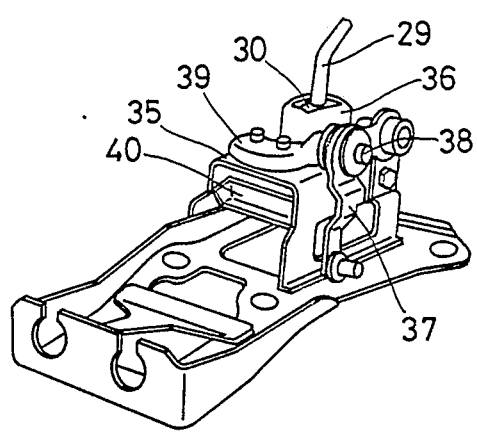
FIG. 14 is a perspective view illustrating another known shift lever assembly.

In the shift lever assembly of this embodiment, the support 4 for supporting the shift lever 10 at its spherical coupling portion 11 consists of two halves, i.e., two identical support sheets 5, 5 which are retained at their outer surfaces by the corresponding two retainer plates 2, 3 disposed on the opposite sides of the support 4. Since the retainer plates 2, 3 hold the two support sheets 5, 5 together so as to sandwich the assembly of the two sheets 5, 5 on its opposite outer surfaces, the present shift lever assembly does not require an elastic shim as required in the conventional arrangement using a retainer cap as indicated at 34 in FIG. 13. Further, since the support sheets 5, 5 are identical and interchangeable with each other, the cost of molding the support sheets 5, 5 and the cost of assembling the assembly may be significantly reduced.

Further, since the support sheets 5, 5 are made of an elastic material, and the spherical support portion 6' is thin-walled so as to elastically hold the spherical coupling portion 11 of the shift lever 10, the spherical support portion 6' may elastically yield upon application of thermal stresses, or upon assembling of the support sheets 5, 5 and the shift lever 10 with relative dimensional errors of the bolt holes 7a, 7b, collars 17, spherical support portion 6', spherical coupling portion 11, etc. Hence, the thin-walled elastic spherical support portion 6' may maintain a proper frictional holding pressure acting on the spherical coupling portion 11, even if the relative position of the coupling portion 11 and the spherical support portion 6' is varied due to wear or thermal expansion and contraction during the use of the shift lever assembly. Thus, the shift lever 10 can be stably and smoothly supported by the support 4.

Although the support sheets 5, 5, of the support 4 used in the present embodiment are thin-walled over their entire hemi-spherical portions 6, 6, as most clearly indicated in FIG. 2, the support 4 for the shift lever 10 may instead be constituted by a pair of support sheets 25, 25 as shown in FIGS. 9 and 10. In this modified embodiment, the portions of the support sheets 25, 25 which have hemi-spherical inner holding surfaces 25a, 25a engaging the spherical coupling portion 11 of the shift lever 10 are comparatively thick-walled, and are not substantially elastically yieldable, unlike the hemispherical portions 6, 6 of the support sheets 5, 5. However, here too the principle of the present invention may be practiced, provided that the two support sheets 25, 25 are held together by the pair of retainer plates 2, 3 such that the pair of support sheets 25, 25 have adjoining surfaces substantially parallel to the plane in which the shift lever 10 extends.

Figure 11:
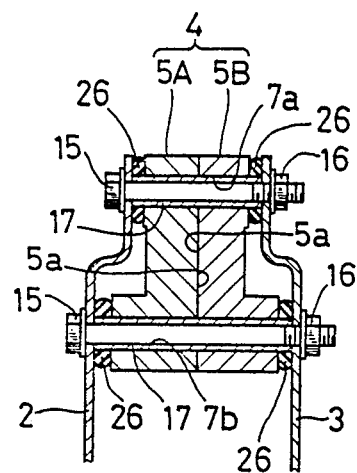
FIG. 11 is a cross sectional view corresponding to FIG. 5, illustrating yet a further embodiment of the invention.

A further modified embodiment of the shift lever assembly is illustrated in FIG. 11. This embodiment is identical with the first embodiment, except for elastic members 26 which are positioned outside the bolt holes 7a, 7b, unlike the elastic members 18 of the first embodiment which are received within the counterbores 7d formed at the opposite ends of the bolt holes 7a, 7b. More specifically, each elastic member 26 fitted on each end portion of the corresponding collar 17 is interposed between the corresponding retainer plate 2, 3 and the outer surface of the corresponding support sheet 5A, 5B, such that the entire width of the elastic member 26 is located outside the bolt hole 7a, 7b. In this embodiment, too, the elastic members 26 absorb a variation in the distance between the retainer plates 2, 3 and the support sheets 5A, 5B due to possible dimensional errors of the sheets 5A, 5B plates 2, 3 and collars 17, or due to possible thermal displacements of the support sheets 5A, 5B relative to the collars 17 and bolts 15. Accordingly, the elastic members 26 effectively protect the spherical support portion 6 against otherwise possible permanent set, and contribute to maintaining a predetermined suitable holding pressure which acts on the spherical coupling portion 11 of the shift lever 10.

Figure 12:
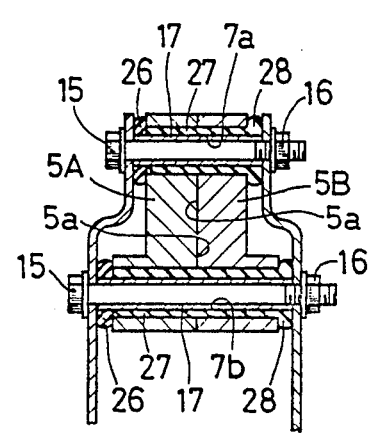
FIG. 12 is a cross sectional view also corresponding to FIG. 5, showing yet a further embodiment of the invention.

For preventing vibrations or oscillations of the engine or transmission gear device from being transmitted to the shift lever 10 via the shift lever assembly, the elastic members 26 are preferably made of a material which has a higher degree of elasticity that the elastic material of the support sheets 5A, 5B. For increased vibration insulating or asborbing effect, it is preferred to provide an elastic vibration insulating sleeve 27 between the outer surface of each collar 17 and the inner surface of the corresponding bolt hole 7a, 7b, as shown in FIG. 12. In this modified embodiment, one of the two elastic members 26, 26 of the embodiment of FIG. 11 is replaced by an elastic member 28 in the form of an integral head portion of the vibration insulating sleeve 27, which head portion 28 is located between the inner surface of the retainer plate 2, 3 and the outer surface of the support sheet 5A, 5B. The elastic members 26 and 28 insulate vibrations in the axial direction of the bolt holes 7a, 7b, while the elastic vibration insulating sleeves 27 insulate vibrations in the radial direction of the bolt holes 7a, 7b.

While the present invention has been described in its preferred embodiments with a certain degree of particularity, it is to be understood that the invention is by no means confined to the precise details of the illustrated embodiments, but may be embodied with various changes, modifications and improvements which may occur to those skilled in the art, without departing from the spirit and scope of the invention defined in the appended claims.

What is claimed is:

1. A shift lever assembly capable of being operatively linked with a transmission, for manually operating the transmission, comprising:

an elongate shift lever including a handle portion by which the shift lever may be manipulated, and a spherical coupling portion by which the shift lever may be universally supported;

a support including two halves in the form of a pair of support sheets which have respective adjoining surfaces substantially parallel to a plane in which a direction of elongation of said shift lever extends, said pair of support sheets cooperating with each other to provide a spherical support portion which engages said spherical coupling portion of said shift lever for universally supporting said shift lever, each of said pair of support sheets having an outer surface opposite to the corresponding adjoining surface; and a pair of stationary retainer plates disposed in spaced-apart relation with each other on opposite sides of said support, such that said pair of stationary retainer plates are held in pressed abutting contact with said outer surfaces of said pair of support sheets, thereby holding said pair of support sheets in abutting contact with each other at said adjoining surfaces thereof.

2. A shift lever assembly according to claim 1, wherein said shift lever further includes an abutment portion, and is pivotally supported about said spherical coupling portion for movement in a first operating plane between a first and a second position, said pair of support sheets including a pair of stopper portions, said abutment portion of said shift lever being abutable against said pair of stopper portions when said shift lever is pivoted to said first and second positions, respectively.

3. A shift lever assembly capable of being operatively linked with a transmission, for manually operating the transmission, comprising:

an elongate shift lever including a handle portion by which the shift lever may be manipulated, and a spherical coupling portion by which the shift lever may be universally supported;

a support including two halves in the form of a pair of support sheets which have respective adjoining surfaces substantially parallel to a plane in which a direction of elongation of said shift lever extends, said pair of support sheets cooperating with each together to provide a spherical support portion which engages said spherical coupling portion of said shift lever for universally supporting said shift lever, each of said pair of support sheets having an outer surface opposite to the corresponding adjoining surface;

a pair of statinary retainer plates disposed in spaced-apart relation with each other on opposite sides of said support, so as to hold said pair of support sheets via said outer surfaces thereof; and a plurality of bolts, each of which penetrates through thickness of said pair of support sheets and said pair of retainer plates for fastening said pair of support sheets to each other via said pair of retainer plates.

4. A shift lever assembly according to claim 3, further comprising a bellcrank having a first arm, and having a second arm connectable to a cable which in turn is connected to said transmission, and wherein said shift lever further includes an selector arm which extends from said spherical coupling portion, said selector arm having a spherical universal coupling end which engages said first arm of said bellcrank, wherein said bellcrank is pivotally connected to said support by one of said plurality of bolts, wherein said one of said plurality of bolts extends through said bellcrank and serves as a support shaft for pivotally supporting said bellcrank, whereby said bellcrank is pivoted about said support shaft when said shift lever is pivoted in a second operating plane parallel to a direction in which said selector arm extends.

5. A shift lever assembly according to claim 4, one of said pair of retainer plates includes a pair of stopper portions which are abutable with said bellcrank to limit a pivotal movement of said bellcrank about said support shaft.

6. A shift lever assembly according to claim 3, further comprising a plurality of bolts, each of which penetrate through thicknesses of said pair of support sheets and said pair of retainer plates for fastening said pair of support sheets to each other via said pair of retainer plates, and wherein said shift lever further includes an abutment portion and is pivotally supported about said spherical coupling portion for movement in a first operating plane between a first and a second position, said pair of support sheets including a pair of stopper portions, said abutment portions of said shift lever being abutable against said pair of stopper portions when said shift lever is pivoted to said first and second positions, respectively, said pair of support sheets further including reinforcement portions through which bolt holes are formed to accommodate said bolts, respectively, said reinforcement portions extending from said pair of stopper portions so as to reinforce said stopper portions.

7. A shift lever assembly according to claim 3, further comprising a plurality of collars made of a material having substantially the same coefficient of thermal expansion as a material of said bolts, and a plurality of elastic members, and wherein said pair of support sheets have a plurality of bolt holes in which said plurality of collars are respectively inserted, said plurality of bolts extending through said plurality of collars, respectively, each of said collars having opposite end faces which are held in abutting contact with said pair of retainer plates, so as to receive tightening forces produced by said plurality of bolts, each of said plurality of elastic members being interposed between a corresponding one of said pair of retainer plates and a corresponding one of said pair of support sheets, said support sheets being clamped together by elastic forces of said plurality of elastic members.

8. A shift lever assembly according to claim 3, further comprising a plurality of elastic vibration insulating members which are respectively disposed between said pair of support sheets, said pair of retainer plates and said plurality of bolts, said elastic vibration insulating members being made of a material having a higher degree of elasticity than materials of said pair of support sheet, said pair of retainer plates and said plurality of bolts.

9. A shift lever assembly according to claim 3, wherein said pair of support sheets are made of an elastic material, and said plurality of bolts consist of a first group of bolts and a second group of bolts, said first and second groups of bolts being disposed symmetrically with each other with respect to a plane perpendicular to said adjoining surfaces of said pair of support sheets.

10. A shift lever assembly capable of being operatively linked with a transmission, for manually operating the transmission, comprising:
   an elongate shift lever including a handle portion by which the shift lever may be manipulated, and a spherical coupling portion by which the shift lever may be universally supported;
   a support including two halves in the form of a pair of support sheets which have respective adjoining surfaces substantially parallel to a plane in which a direction of elongation of said shift lever extends, said pair of support sheets cooperating with each other to provide a spherical support portion which engages said spherical coupling portion of said shift lever for universally supporting said shift lever, said spherical support portion having a wall thickness small enough to elastically hold said spherical coupling portion of said shift lever, each of said pair of support sheets having an outer surface opposite to the corresponding adjoining surface.
   a pair of stationary retainer plates disposed in spaced-apart relation with each other on opposite sides of said support, such that said stationary retainer plates are held in pressed abutting contact with portions of said outer surfaces of said pair of support sheets which are disposed away from said spherical support portion in a direction parallel to a plane of said adjoining surfaces.

11. A shift lever assembly capable of being operatively linked with a transmission, for manually operating the transmission, comprising:
   an elongate shift lever including a handle portion by which the shift lever may be manipulated, a spherical coupling portion by which the shift lever may be universally supported, and an abutment portion, said shift lever being pivotally supported about said spherical coupling portion for movement in an operating plane between a first and second position;
   a support inlcuding two halves in the form of a pair of support sheets which have respective adjoining surfaces substantially parallel to a plane in which a direction of elongation of said shift lever extends, said pair of support sheets cooperating with each other to provide a spherical support portion which engages said spherical coupling portion of said shift lever for universally supporting said shift lever, said pair of support sheets including a pair of stopper portions against which said abutment portion of said shift lever is abutable when said shift lever is pivoted to said first and second positions, respectively; and
   retainer means for retaining said pair of support sheets so that said support sheets are held in abutting contact with each other at said adjoining surfaces.

* * * * *